(12) United States Patent
Kawasaki et al.

(10) Patent No.: US 12,073,135 B2
(45) Date of Patent: Aug. 27, 2024

(54) INFORMATION PROCESSING SYSTEM, INFORMATION PROCESSING METHOD, INFORMATION PROCESSING APPARATUS, AND NON-TRANSITORY RECORDING MEDIUM FOR MANAGING A JOB USING AN IMAGE CODE

(71) Applicants: Hajime Kawasaki, Chiba (JP); Makoto Aoki, Tokyo (JP)

(72) Inventors: Hajime Kawasaki, Chiba (JP); Makoto Aoki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/450,610

(22) Filed: Aug. 16, 2023

(65) Prior Publication Data

US 2024/0078066 A1 Mar. 7, 2024

(30) Foreign Application Priority Data

Sep. 2, 2022 (JP) ................. 2022-139894

(51) Int. Cl.
*G06F 3/12* (2006.01)
*G06K 7/12* (2006.01)
(Continued)

(52) U.S. Cl.
CPC .......... *G06F 3/1259* (2013.01); *G06F 3/1203* (2013.01); *G06F 3/1282* (2013.01); *G06K 7/12* (2013.01); *H04N 1/00466* (2013.01); *H04N 1/32112* (2013.01); *H04N 2201/0084* (2013.01); *H04N 2201/3222* (2013.01); *H04N 2201/3269* (2013.01)

(58) Field of Classification Search
None
See application file for complete search history.

(56) References Cited

U.S. PATENT DOCUMENTS

| | | | |
|---|---|---|---|
| 2012/0030678 A1* | 2/2012 | Hayduchok | ........ H04N 1/32122 718/101 |
| 2018/0046416 A1* | 2/2018 | Watanabe | ............. G06F 3/1285 |

(Continued)

FOREIGN PATENT DOCUMENTS

| | | |
|---|---|---|
| JP | 2017-199306 A | 11/2017 |
| JP | 2020-021181 A | 2/2020 |
| JP | 2020-155118 A | 9/2020 |

OTHER PUBLICATIONS

U.S. Appl. No. 18/178,873, filed Mar. 6, 2023.

*Primary Examiner* — Henok Shiferaw
(74) *Attorney, Agent, or Firm* — IPUSA, PLLC

(57) ABSTRACT

An information processing system includes one or more image capturing devices and circuitry. The one or more image capturing devices capture a first slip and a second slip to generate one or more images. The first slip has a first image code corresponding to a first type of identification information thereon, and the second slip has a second image code corresponding to a second type of identification information thereon. The circuitry is to manage a position of the first slip based on the first image code recognized from the one or more images, manage a position of the second slip based on the second image code recognized from the one or more images, and display the position of the second slip in response to an operation performed by a user.

12 Claims, 19 Drawing Sheets

(51) Int. Cl.
    *H04N 1/00*         (2006.01)
    *H04N 1/32*         (2006.01)

(56) References Cited

U.S. PATENT DOCUMENTS

| | | | |
|---|---|---|---|
| 2019/0384553 A1* | 12/2019 | Wakamatsu | G06F 3/1273 |
| 2020/0034592 A1* | 1/2020 | Kawasaki | G06Q 10/06312 |
| 2020/0293239 A1 | 9/2020 | Kawasaki et al. | |
| 2021/0132874 A1 | 5/2021 | Kawasaki et al. | |
| 2021/0240957 A1 | 8/2021 | Kawasaki et al. | |
| 2021/0294548 A1* | 9/2021 | Kawasaki | G06F 3/1285 |
| 2021/0297553 A1* | 9/2021 | Kawasaki | H04N 1/32352 |
| 2022/0300217 A1 | 9/2022 | Kawasaki et al. | |
| 2022/0303410 A1 | 9/2022 | Kawasaki et al. | |
| 2023/0231955 A1* | 7/2023 | Clark | H04N 1/00358 |
| | | | 358/448 |
| 2023/0269333 A1* | 8/2023 | Kikumoto | H04N 1/00042 |
| | | | 358/1.13 |

* cited by examiner

FIG. 8
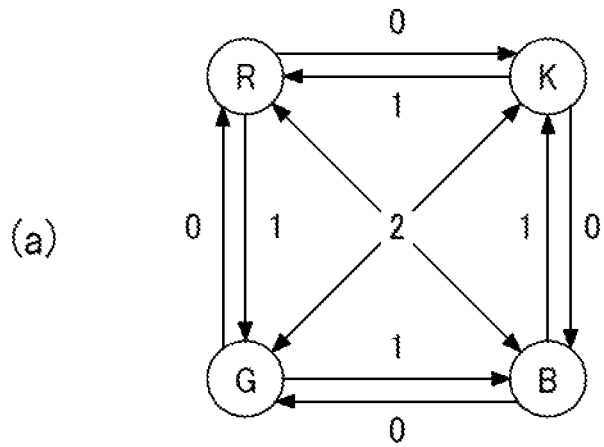
(a)
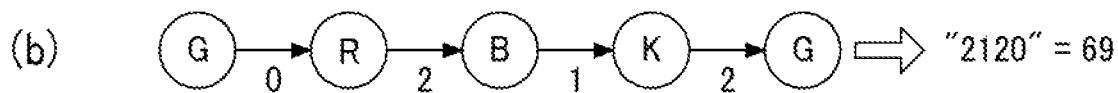
(b)
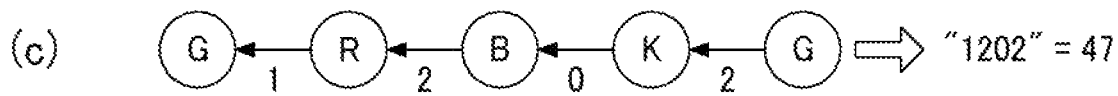
(c)
(d)
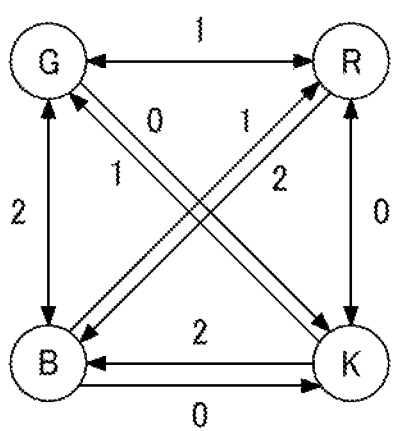
(e)

INFORMATION PROCESSING SYSTEM, INFORMATION PROCESSING METHOD, INFORMATION PROCESSING APPARATUS, AND NON-TRANSITORY RECORDING MEDIUM FOR MANAGING A JOB USING AN IMAGE CODE

CROSS-REFERENCE TO RELATED APPLICATIONS

This patent application is based on and claims priority pursuant to 35 U.S.C. § 119(a) to Japanese Patent Application No. 2022-139894, filed on Sep. 2, 2022, in the Japan Patent Office, the entire disclosure of which is hereby incorporated by reference herein.

BACKGROUND

Technical Field

Embodiments of the present disclosure relate to an information processing system, an information processing method, an information processing apparatus, and a non-transitory recording medium.

Related Art

In the related art, there is a technology of managing the progress of a job having a plurality of work processes based on a position of a work instruction sheet (such as a slip) with a color code captured by cameras.

SUMMARY

In one aspect, an information processing system includes one or more image capturing devices and circuitry. The one or more image capturing devices capture a first slip and a second slip to generate one or more images. The first slip has a first image code corresponding to a first type of identification information thereon, and the second slip has a second image code corresponding to a second type of identification information thereon. The circuitry is to manage a position of the first slip based on the first image code recognized from the one or more images, manage a position of the second slip based on the second image code recognized from the one or more images, and display the position of the second slip in response to an operation performed by a user.

In another aspect, an information processing method includes capturing, by one or more image capturing devices, a first slip and a second slip to generate one or more images. The first slip has a first image code corresponding to a first type of identification information thereon, and the second slip has a second image code corresponding to a second type of identification information thereon. The method further includes managing a position of the first slip based on the first image code recognized from the one or more images, managing a position of the second slip based on the second image code recognized from the one or more images, and displaying the position of the second slip in response to an operation performed by a user.

In another aspect, an information processing apparatus includes circuitry to obtain one or more images of a first slip and a second slip. The first slip has a first image code corresponding to a first type of identification information thereon, and the second slip has a second image code corresponding to a second type of identification information thereon. The circuitry is further to manage a position of the first slip based on the first image code recognized from the one or more images, manage a position of the second slip based on the second image code recognized from the one or more images, and display the position of the second slip in response to an operation performed by a user.

In another aspect, a non-transitory recording medium storing a plurality of program codes which, when executed by one or more processors, causes the one or more processors to perform the information processing method described above.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 8 is a diagram illustrating encoding rules to represent a value in the ternary numeral system according to embodiments of the present disclosure;

Figure 1:
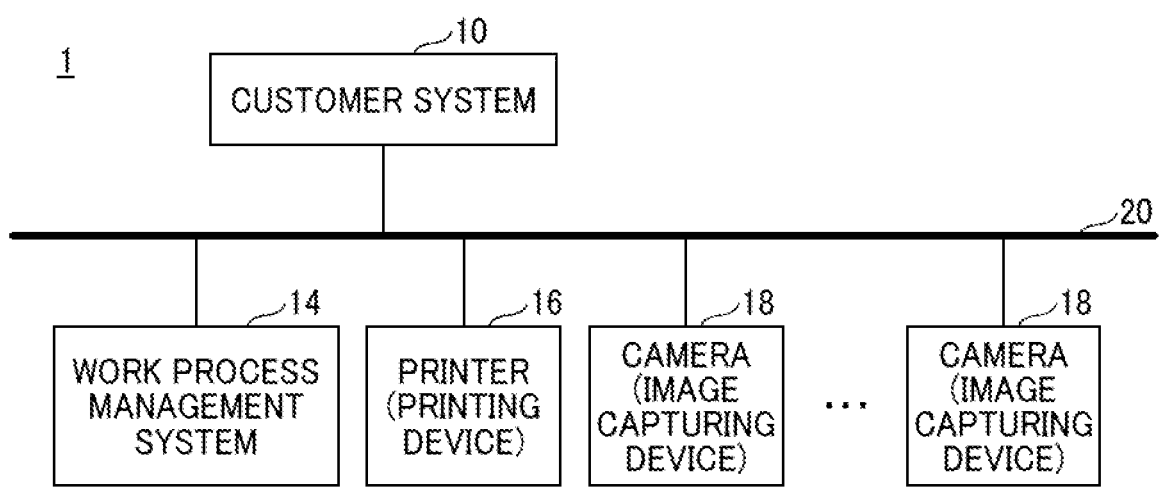
FIG. 1 is a block diagram illustrating a hardware configuration of an information processing system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings.

First Embodiment

Configuration of Information Processing System

Figure 2A:
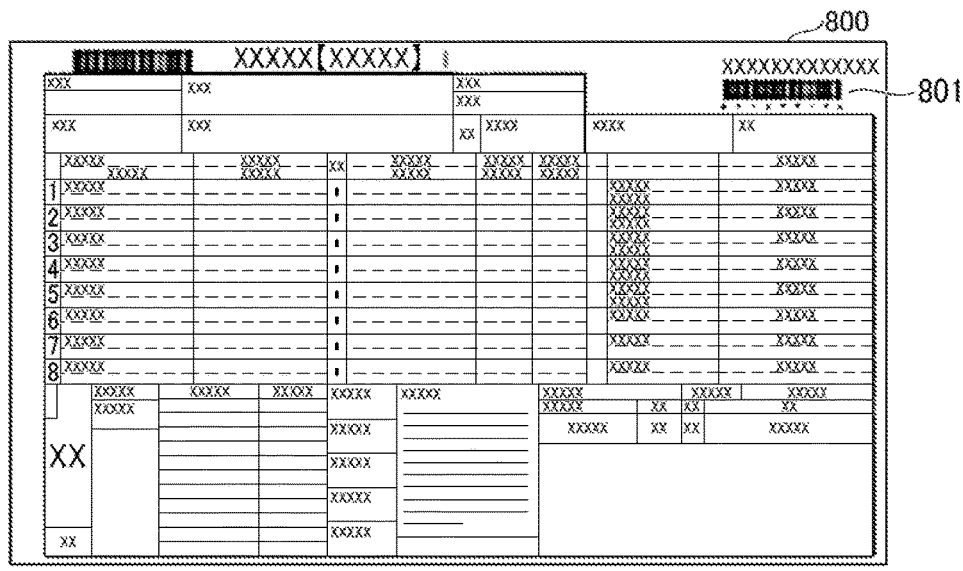
FIGS. 2A and 2B are diagrams each illustrating a slip used in an information processing system according to embodiments of the present disclosure.
Figure 2B:
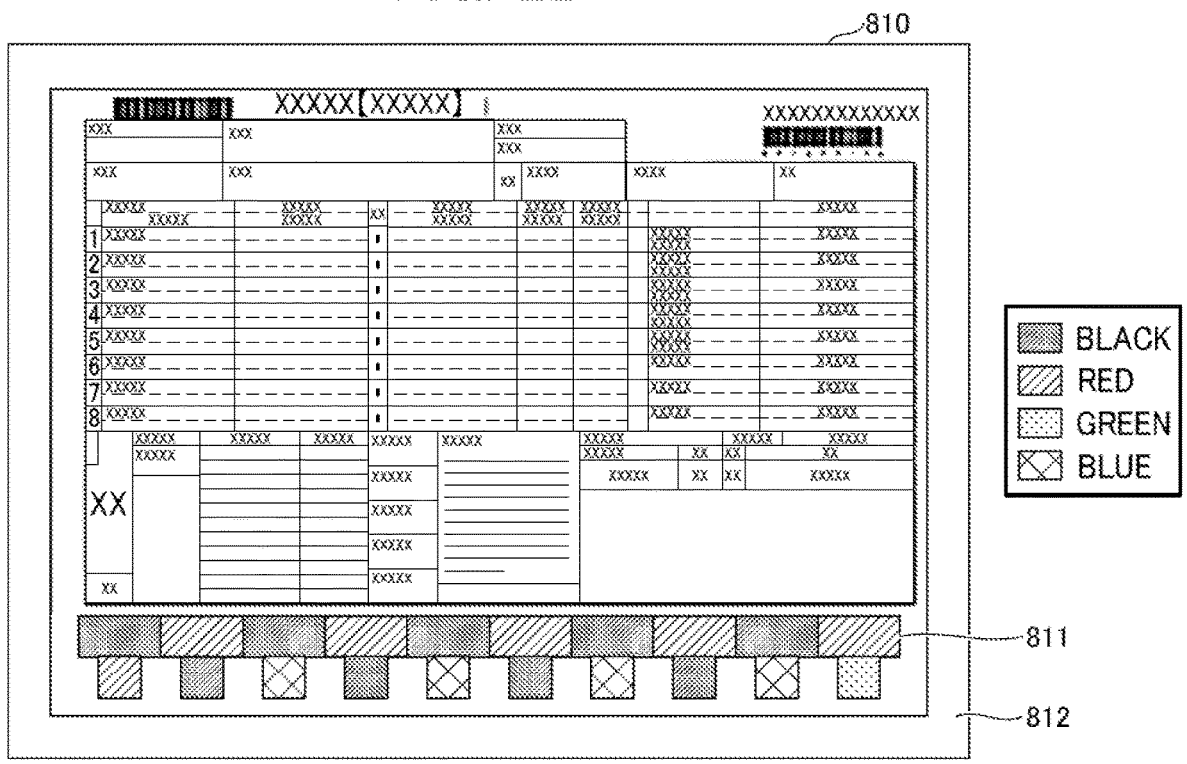

FIG. 1 is a block diagram illustrating a hardware configuration of an information processing system according to the present embodiment. FIGS. 2A and 2B are diagrams each illustrating a slip used in an information processing system according to the present embodiment. In an information processing system 1 of FIG. 1, a customer system 10, a work process management system 14, a printer 16, and one or more cameras 18 are communicably connected via a network 20 such as the Internet or a local area network (LAN). In the following description, the one or more cameras 18 may be referred to as a camera 18 unless the one or more cameras 18 are to be distinguished from each other. The camera 18 serves as an image capturing device.

The customer system 10 is, for example, a system at a customer site used by a customer. The customer is, for example, a company that uses the work process management system 14 in addition to the customer system 10, and may be a printing company. The customer system 10 creates, for example, a slip 800 for the customer system 10 as illustrated in FIG. 2A. A job identification (ID) is presented on the slip 800. The slip 800 is, for example, a work instruction sheet. The job ID is information used for identifying a job in the customer system 10. At least one bar code image 801 used in the customer system 10 is presented on the slip 800.

The job ID may be presented as the bar code image 801 on the slip 800 for the customer system 10, or may be presented as text. The customer system 10 provides an operator with existing functions as instructed by the slip 800 for the customer system 10.

The work process management system 14, the printer 16, and the one or more cameras 18 may make up a function addition system that adds new functions to the slip 800. The work process management system 14 manages the progress of a job having a plurality of work processes using a slip 810, for the work process management system 14, on which a color code image 811 is presented as illustrated in FIG. 2B. The work process management system 14 can identify a job ID from the color code image 811.

The printer 16 prints the slip 800 for the customer system 10 and the slip 810 for the work process management system 14. The one or more cameras 18 are installed so as to capture places associated with the work processes of a job. Specifically, the one or more cameras 18 are installed so as to capture the slip 810 for the work process management system 14 at places associated with the work processes of the job. The places (positions) associated with the work processes of the job are, for example, places where an article (for example, a printed matter, a product, a delivery item, or a repair part for a repair and cleaning factory) passes through during movement between the work processes or a temporary storage place where the article is temporarily stored.

For example, a pan-tilt-zoom (PTZ) camera or an internet protocol (IP) camera may be used as the camera 18. The PTZ camera is a camera of which pan, tilt, and zoom functions can be operated via the network 20, and is a camera that can transmit a captured image or a captured moving image via the network 20. The IP camera is a camera that can be operated via the network 20, and is a camera that can transmit a captured image or a captured moving image via the network 20. The captured image or the captured moving image captured by the camera 18 is transmitted to the work process management system 14 via the network 20.

For example, in the infatuation processing system 1 that manages the work processes of a job in a printing factory, the slip 810 for the work process management system 14 is attached to a printed matter that is an intermediate product or a material of a job corresponding to the slip 810. The slip 810 is attached on a printed matter so as to be easily captured by, for example, the one or more cameras 18.

The work process management system 14 manages the progress (state) of the work processes of the job based on the work processes associated with the one or more cameras 18 that have captured the slip 810 and the job ID specified from the color code image 811 of the slip 810. The work process management system 14 can specify a position of the slip 810 that is special, as will be described later, based on the work processes associated with the one or more cameras 18 that have captured the slip 810 and the color code image 811 of the slip 810. The work process management system 14 manages at least one of a history of the work processes of the job and the captured image or the captured moving image representing a state when the slip 810 is captured.

The configuration of the information processing system 1 illustrated in FIG. 1 is given by way of example. For example, the information processing system 1 may include other systems, and the work process management system 14 may have a different name. The work process management system 14 may be implemented by a single information processing apparatus or by a plurality of information processing apparatuses.

Hardware Configuration

Each of the customer system 10 and the work process management system 14 includes one or more information processing apparatuses. Each of the one or more information processing apparatuses is implemented by, for example, a computer 500 having a hardware configuration illustrated in FIG. 3.

Figure 3:
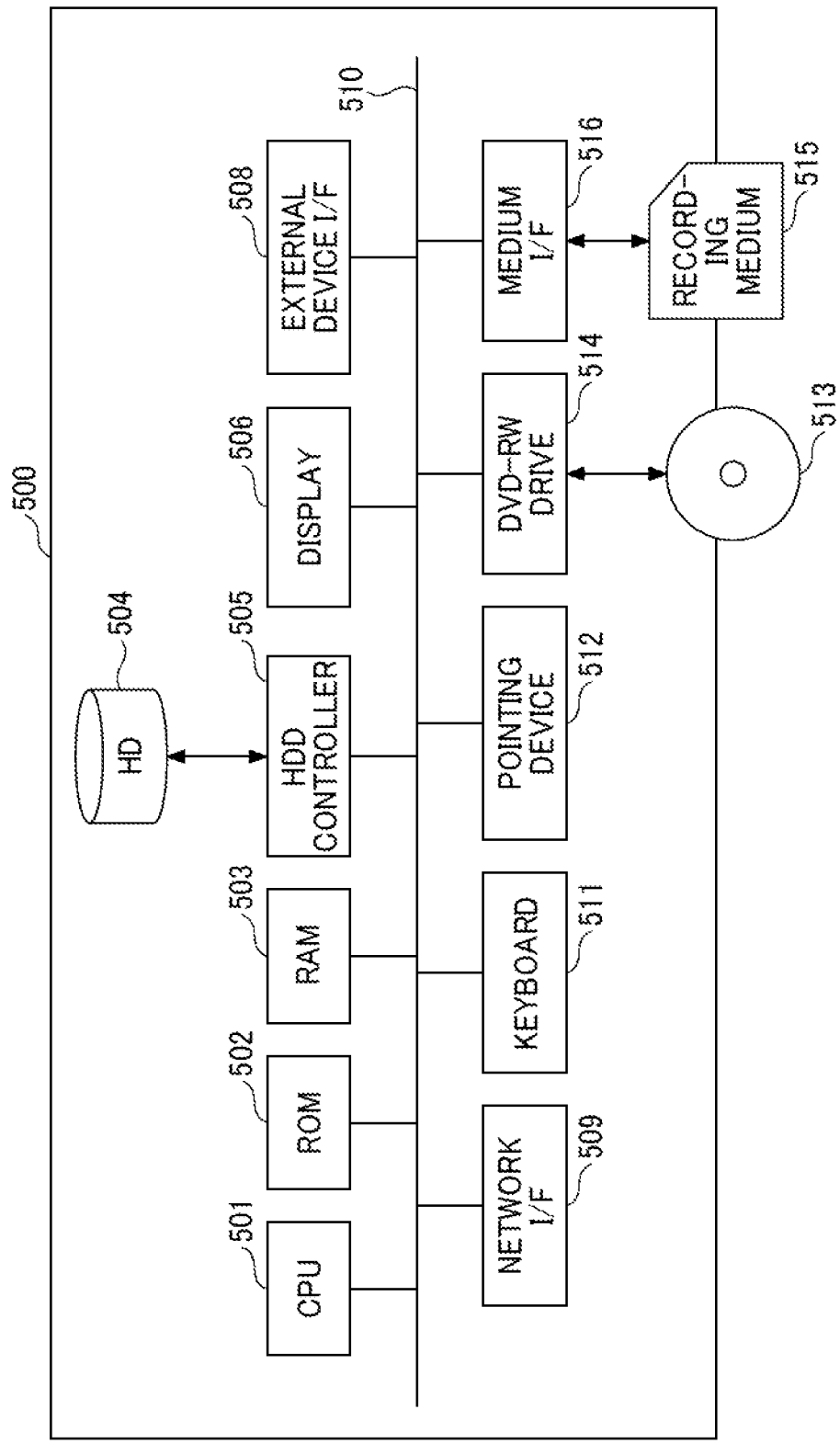
FIG. 3 is a block diagram illustrating a hardware configuration of a computer according to embodiments of the present disclosure.

FIG. 3 is a block diagram illustrating a hardware configuration of the computer 500 according to the present embodiment. As illustrated in FIG. 3, the computer 500 includes a central processing unit (CPU) 501, a read only memory (ROM) 502, a random access memory (RAM) 503, a hard disk (HD) 504, a hard disk drive (HDD) controller 505, a display (such as a display 506), an external device interface (I/F) 508, a network interface (I/F) 509, input devices (such as a keyboard 511 and a pointing device 512), a digital versatile disc rewritable (DVD-RW) drive 514, and a medium interface (I/F) 516, which are connected to each other via a bus 510. The input devices and the display are not necessarily constantly connected to the bus 510, but may be connected to the bus 510 via the external device I/F 508 when being used.

The computer 500 includes the keyboard 511, the pointing device 512 (e.g., a mouse), and a touch panel as the input devices, which are used by an operator to input operation signals. The computer 500 includes the display 506 as a display device, which displays a result of processing performed by the computer 500.

The network I/F 509 is an interface that connects the computer 500 to various networks. Thus, the computer 500 can perform data communication with the one or more cameras 18 and the printer 16 via the network I/F 509.

The HD 504 stores various data such as a control program. The HDD controller 505 controls the reading and writing of various data from and to the HD 504 under the control of the CPU 501. Examples of the program and data include an operating system (OS) as basic software for controlling the entire operation of the computer 500 and application software providing various functions on the OS. The application software may be referred to as an "application" in the following description, in order to simplify the description. In place of the HDD controller 505, the computer 500 may include a drive device (for example, a solid state drive (SSD)) that uses a flash memory as a recording medium.

The external device OF 508 includes a terminal such as a universal serial bus (USB) or a HIGH-DEFINITION MULTIMEDIA INTERFACE (HDMI) as an interface with an external device. The DVD-RW drive 514 controls the reading and writing of various data from and to a DVD-RW 513, which serves as a removable recording medium. The medium I/F 516 controls the reading and writing (storing) of data from and to a recording medium 515 such as a flash memory. Such a configuration allows the computer 500 to perform reading from and writing to the recording medium 515 via the medium I/F 516. Examples of the recording medium 515 include a flexible disk, a compact disc (CD), a digital versatile disc (DVD), a secure digital (SD) memory card, and a universal serial bus (USB) memory.

The ROM 502 serves as a nonvolatile semiconductor memory (a storage device) that retains the programs and data even when the power is turned off. The ROM 502 stores programs and data such as a basic input/output system (BIOS), OS settings, and network settings, which are executed when the computer 500 is activated. The RAM 503 serves as a volatile semiconductor memory (a storage device) that temporarily retains programs and data.

The CPU 501 is an arithmetic device that reads programs and data from a storage device such as the ROM 502 and the HD 504 onto the RAM 503 and executes processing to implement the entire control and functions of the computer 500.

Each of the customer system 10 and the work process management system 14 can achieve various processing to be described later by, for example, a hardware configuration of the computer 500 as illustrated in FIG. 3. Descriptions of the hardware configurations of the printer 16 and the one or more cameras 18 are omitted.

Functional Configuration

Figure 4:
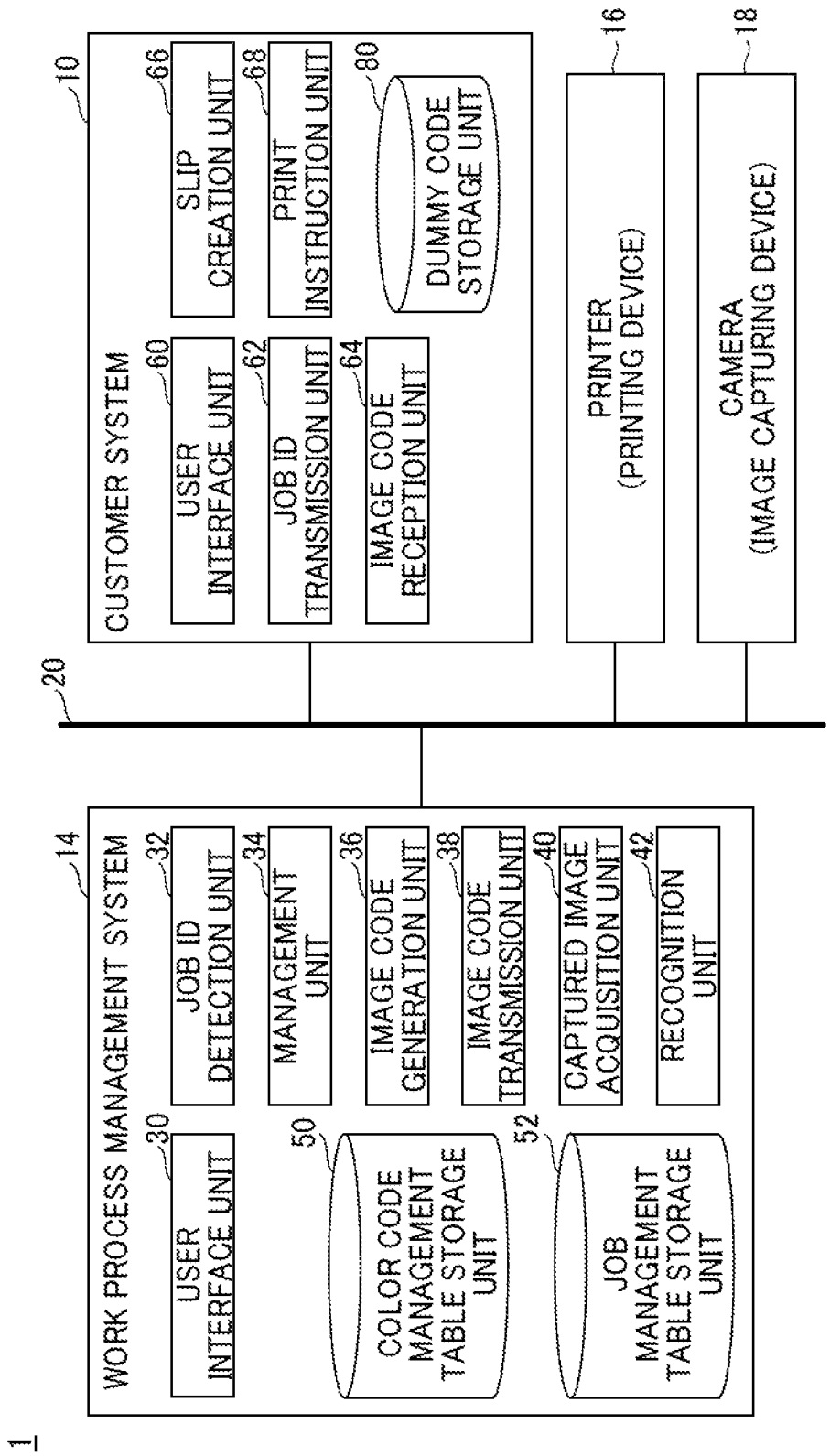
FIG. 4 is a block diagram illustrating a functional configuration of an information processing system according to embodiments of the present disclosure.

FIG. 4 is a block diagram illustrating a functional configuration of the information processing system 1 according to the present embodiment. In the description of the functional configuration illustrated in FIG. 4, descriptions of components unnecessary for the description of the present embodiment may be omitted as appropriate.

As illustrated in FIG. 4, the work process management system 14 includes a user interface unit 30, a job identification (ID) detection unit 32, a management unit 34, an image code generation unit 36, an image code transmission unit 38, a captured image acquisition unit 40, a recognition unit 42, a color code management table storage unit 50, and a job management table storage unit 52. The user interface unit 30 serves as a user interface means. The management unit 34 serves as a management means. The image code generation unit 36 serves as an image code generation means. The captured image acquisition unit 40 serves as a captured image acquisition means. These units 30 to 42 are implemented by the CPU 501 that executes processing according to a control program. The storage units 50 and 52 may be implemented by any desired memory such as the RAM 503 or the HD 504.

The customer system 10 includes a user interface unit 60, a job identification (ID) transmission unit 62, an image code reception unit 64, a slip creation unit 66, a print instruction unit 68, and a dummy code storage unit 80. The slip creation unit 66 serves as a slip creation means. These units 60 to 64 are implemented by the CPU 501 that executes processing according to a control program. The storage unit 80 is implemented by any desired memory such as the RAM 503 or the HD 504.

The user interface unit 30 of the work process management system 14 controls display of various screens and receives various operations from the operator. The job ID detection unit 32 detects, for example, a job ID presented as the bar code image 801 or text on the slip 800 for the customer system 10 illustrated in FIG. 2A.

The management unit 34 stores and manages available color code identifications (IDs) in the color code management table storage unit 50. The management unit 34 associates an acquired job ID and a color code ID with each other and manages the acquired job ID and the color code ID in the color code management table storage unit 50. The management unit 34 acquires a job ID from a job list received from the customer system 10. Alternatively, the management unit 34 may acquire a job ID detected by the job ID detection unit 32. The job ID serves as information used for identifying a job. The job list includes information on a plurality of jobs, such as jobs scheduled to be processed for one day. The management unit 34 manages the color code IDs that have already been acquired by the customer system 10 in the color code management table storage unit 50 so as to be used as dummy code identifications (IDs) to be described later.

The management unit 34 also stores and manages job information corresponding to the job IDs and the color code IDs in the job management table storage unit 52. The job management table storage unit 52 stores the progress information and the history information of the work processes of jobs and files including captured images and captured moving images representing states when the slip 810 is captured.

The image code generation unit 36 generates the color code image 811 from the color code ID transmitted from the management unit 34. The image code transmission unit 38 transmits the color code image 811 generated by the image code generation unit 36 to the customer system 10.

The captured image acquisition unit 40 acquires a captured image or a captured moving image from the camera 18. The recognition unit 42 decodes the color code image 811 included in the captured image or the captured moving image to obtain a color code ID. The recognition unit 42 transmits, to the management unit 34, for example, identification information for identifying the camera 18 that has captured the color code image 811 or a work process of the job and the color code ID decoded from the color code image 811. The management unit 34 refers to the job management table storage unit 52 to specify the information on the job corresponding to the color code ID recognized by the recognition unit 42.

The management unit 34 updates the progress information (the status) of the work processes of the job managed in the job management table storage unit 52, based on the work process of the job corresponding to the camera 18 that has captured the color code image 811 and the job ID corresponding to the color code ID decoded from the color code image 811.

The user interface unit 60 of the customer system 10 controls the display of various screens and receives various operations from the operator. The job ID transmission unit 62 transmits, to the work process management system 14, the job ID of the job for which the slip 810 is created. Alternatively, the job ID transmission unit 62 may transmit the job list to the work process management system 14.

The image code reception unit 64 receives the color code image 811 from the work process management system 14. The slip creation unit 66 creates the slip 810 for the work process management system 14 on which the color code image 811 is presented as illustrated in FIG. 2B. The print instruction unit 68 instructs the printer 16 to print the slip 810 illustrated in FIG. 2B.

The dummy code storage unit 80 stores a color code image of the color code ID to be used as a dummy code ID. The color code image of the color code ID, which may be referred to simply as a dummy code in the following description and is used as the dummy code ID, is used to manage a specific job distinguishably from ordinary jobs. The dummy code ID is stored in the dummy code storage unit 80 of the customer system 10 in advance, for example, in the setting stage of the information processing system 1.

For example, when a failure occurs in the work process management system 14 and the color code image 811 is not received from the work process management system 14, the customer system 10 cannot create the slip 810 on which the color code image 811 is presented. During the occurrence of the failure, the work processes of the job can be continued using the slip 800 for the customer system 10, for example. However, with the slip 800 for the customer system 10 created at the occurrence of the failure, the work process management system 14 cannot manage the work processes of the job after the failure is resolved. In addition, when the slip 800 for the customer system 10 created at the occurrence of the failure is replaced with the slip 810 for the work process management system 14 after the failure is resolved, the work process management system 14 cannot specify the position of the slip 800 for the customer system 10.

For this reason, in the present embodiment, when a failure occurs in the work process management system 14 and the customer system 10 does not receive the color code image 811 from the work process management system 14, the work processes of the job is continued using a provisional slip on which a color code image serving as a dummy code is presented, as will be described later. After the failure is resolved, in the present embodiment, the position of the provisional slip can be managed by the color code image serving as the dummy code presented on the provisional slip being recognized. Thus, the facilitation of recovery work performed by the operator such as replacement work to replace the provisional slip with a true slip is supported.

The true slip is the slip 810 for the work process management system 14 associated with the job managed by the work process management system 14. By contrast, the provisional slip may be considered as the slip 810 for the work process management system 14 that is not associated with the job managed by the work process management system 14. The use of the provisional slip on which the color code image serving as the dummy code is presented is not limited to the case where a failure occurs, but can be used in a case that the position of a specific job is desired to be managed distinguishably from ordinary jobs. In the present embodiment, the dummy code storage unit 80 stores the color code image serving as the dummy code. Alternatively, a color code ID to be used as a dummy code ID may be stored in the dummy code storage unit 80 and a color code image serving as the dummy code may be generated from the color code ID. Further, in the present embodiment, a provisional slip printed in advance can be used.

Process

Figure 5:
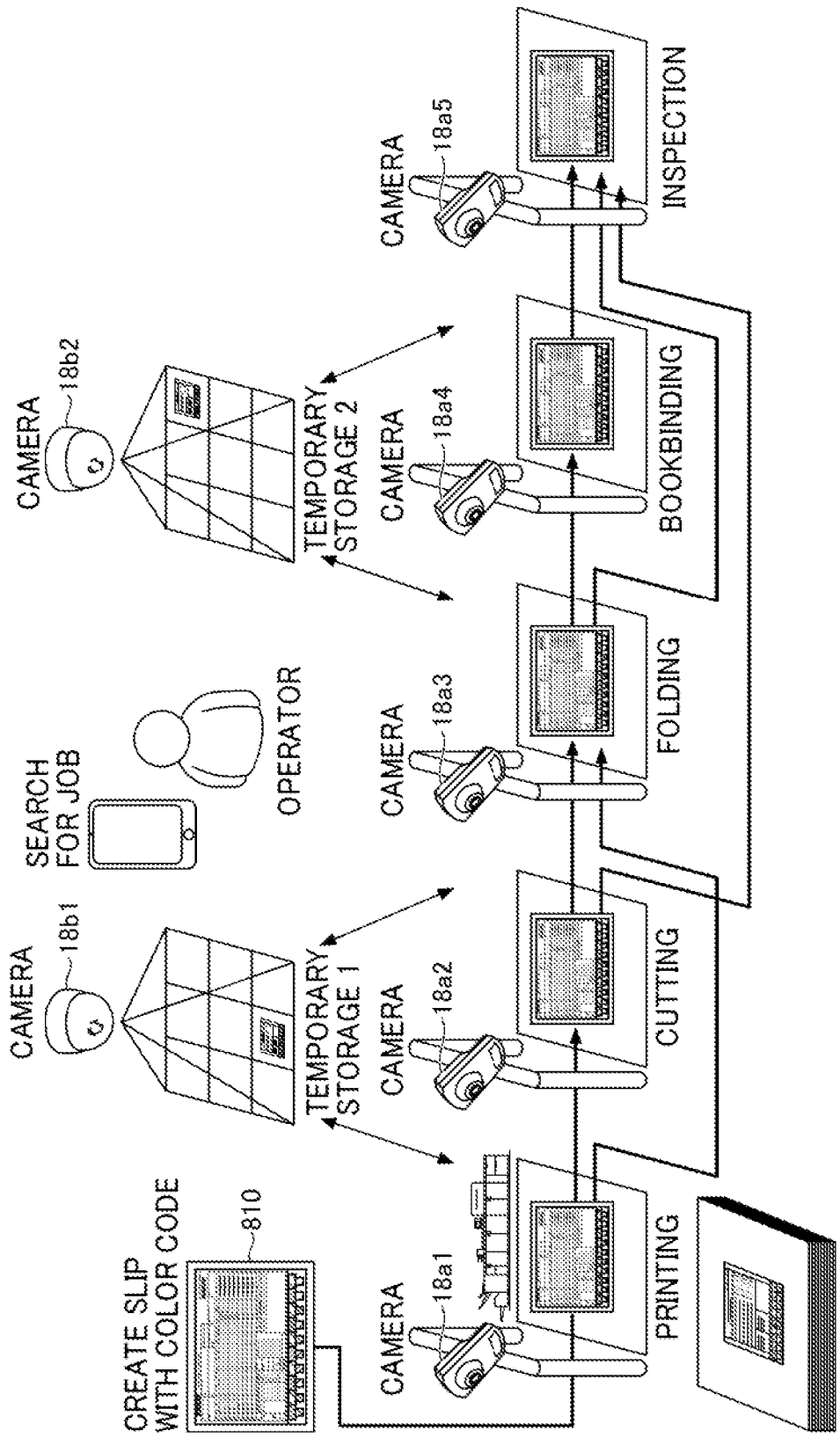
FIG. 5 is a diagram illustrating work processes of a job in a printing factory according to embodiments of the present disclosure.

An information processing system that manages the work processes of a job to be performed on an article in a printing factory is described below. FIG. 5 is a diagram illustrating the work processes of a job to be performed on an article in a printing factory according to the present embodiment.

The work processes illustrated in FIG. 5 include "printing," "cutting," "folding," "bookbinding," "inspection," "temporary storage 1," and "temporary storage 2." Cameras 18a1 to 18a5 are installed at gates located upstream from places where the work processes "printing," "cutting," "folding," "bookbinding," and "inspection" are performed, respectively. In addition, cameras 18b1 to 18b2 are installed at places where the work processes "temporary storage 1" and "temporary storage 2" are performed, respectively. The cameras 18a1 to 18a5 may be collectively referred to as cameras 18a, and one thereof is referred to as a camera 18a, in the following description. Also, the cameras 18b1 to 18b2 may be collectively referred to as cameras 18b, and one thereof is referred to as a camera 18b, in the following description.

The slip 810 for the work process management system 14, such as a true slip or a provisional slip, is captured by the cameras 18a or the cameras 18b as the article moves between places corresponding to the work processes or as the article is in the state of being stored in the temporary storages. Note that, as illustrated in FIG. 5, the movement between work processes in the printing factory is not constant. The slip 810 for the work process management system 14 may not be captured depending on the job, and therefore some work processes are not detected or recorded in some cases. FIG. 5 illustrates arrows indicating the movement of the article on which all the work processes of the job are performed, and other arrows indicating the movement of the article on which some of the work processes of the job are skipped.

In FIG. 5, after a printed matter is output by the work process "printing," the slip 810 is attached onto the printed matter. Accordingly, in the present embodiment described with reference to FIG. 5, the slip 810 attached onto the printed matter is captured by the cameras 18a or the cameras 18b at the processes in which the printed matter passes through the gates or in the state in which the printed matter is stored in the temporary storages.

Creation of Slip with Color Code Image

In the following description, the processing of the information processing system 1 when the work process management system 14 is operating under normal operating conditions and the processing of the information processing system 1 when the work process management system 14 is stopped due to a failure are described separately.

Figure 6:
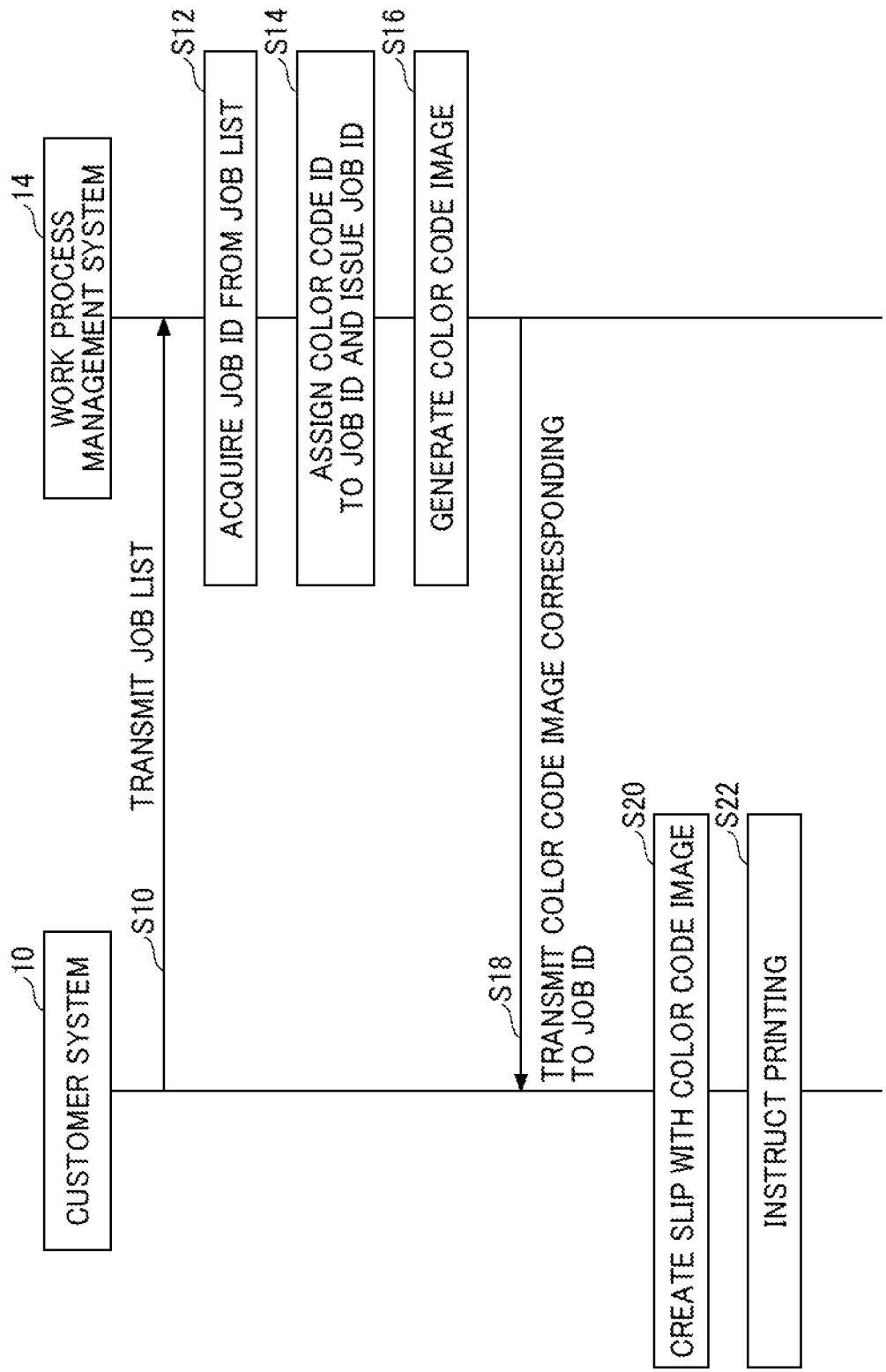
FIG. 6 is a sequence chart illustrating processing to create a slip with a color code image according to embodiments of the present disclosure.

The processing of the information processing system 1 when the work process management system 14 is operating under normal operating conditions is performed as illustrated in FIG. 6, for example. FIG. 6 is a sequence chart illustrating processing to create a slip with a color code image according to the present embodiment.

In step S10, the job ID transmission unit 62 of the customer system 10 transmits a job list to the work process management system 14. In step S12, the management unit 34 of the work process management system 14 acquires a job ID from the job list received from the customer system 10.

In step S14, the management unit 34 selects a color code ID to be used from the color code management table storage unit 50, assigns the color code ID to the job ID acquired from the job list, and issues the job ID. The management unit 34 manages the color code ID and the job ID acquired from the job list in association with each other.

Figure 7:
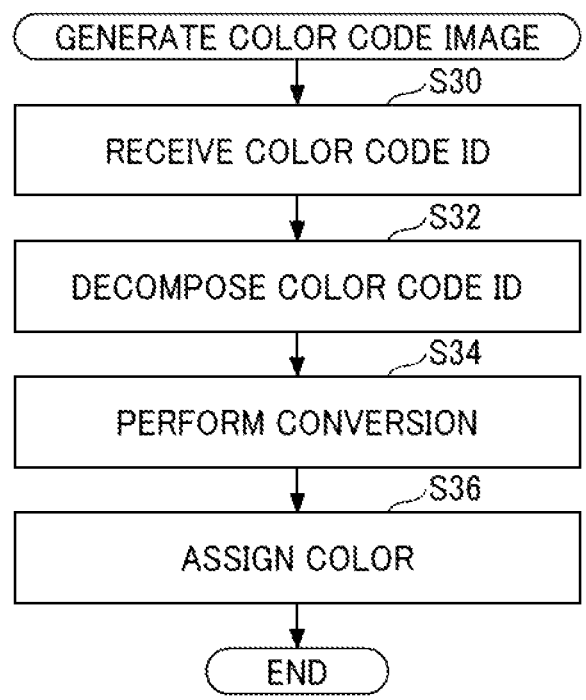
FIG. 7 is a flowchart of processing to generate a color code image according to embodiments of the present disclosure.

In step S16, the image code generation unit 36 generates the color code image 811 from the color code ID associated with the job ID acquired from the job list, for example, according to the processing illustrated in FIG. 7.

FIG. 7 is a flowchart of processing to generate a color code image according to the present embodiment. In step S30, the image code generation unit 36 receives an input of the color code ID to be color-coded. In step S32, the image code generation unit 36 decomposes the character string of the color code ID into values of individual digits.

In step S34, the image code generation unit 36 converts the decomposed values of the individual digits into a value corresponding to the number of colors to be assigned to individual cells of an optical symbol. For example, in a case that the number of colors to be assigned to the individual cells is four, the image code generation unit 36 converts the values of the individual digits into a value in the ternary numeral system according to, for example, the encoding rules illustrated in FIG. 8.

FIG. 8 is a diagram illustrating encoding rules to represent a value in the ternary numeral system. In FIG. 8, encoding rules in a case that four colors of red (R), green (G), blue (B), and black (B) are used are illustrated. When four colors are used, three values, i.e., a value in the ternary numeral system, can represent the four colors.

For example, as illustrated in part (a) of FIG. 8, an individual transition in the clockwise direction, i.e., the individual transition from R to K, from K to B, from B to G, or from G to R, is represented by a value "0." Further, an individual transition in the counterclockwise direction, i.e., the individual transition from R to G, from G to B, from B to K, or from K to R, is represented by a value "1." Furthermore, an individual transition in a diagonal direction, i.e., each of bi-directional transitions between R and B and each of bi-directional transitions between K and G, is represented by a value "2."

For example, as illustrated in part (b) of FIG. 8, a description is given of a case where transitions of the colors in the cells from left to right in a cell string in which each cell is sequentially connected in an order of G, R, B, K, and G are performed. In this case, the transition from G to R is represented by the value "0," the transition from R to B is represented by the value "2," the transition from Br to K is represented by the value "1," and the transition from K to G is represented by the value "2." Accordingly, the arrangement in part (b) of FIG. 8 is represented by a value "3d2120," which is "69" in the decimal numeral system. Note that "3d" at the beginning of the notation of the value indicates that the following number is a value in the ternary numeral system.

The encoding rule to be used for transitions among four colors is not limited to the encoding rule illustrated in part (a) of FIG. 8. Another encoding rule, for example, an encoding rule illustrated in part (d) of FIG. 8, may be alternatively used. In part (e) of FIG. 8, a conversion table for associating transitions among the four colors and values in accordance with the encoding rule illustrated in part (d) of FIG. 8 is illustrated. In part (e) of FIG. 8, for example, when a color in a cell indicating a transition origin is R and a transition to an adjacent color is represented by the value "2," the adjacent color in a cell indicating a transition destination is B. Similarly, when a color in a cell indicating a transition origin is K and a transition to an adjacent color is represented by the value "1," the adjacent color in a cell indicating a transition destination is G.

In step S36 following step S34 in FIG. 7, the image code generation unit 36 assigns the four colors to the individual cells of the optical symbol in accordance with the color in a cell indicating a transition origin, the value in the ternary numeral system converted in step S34, and the encoding rule illustrated in part (a) of FIG. 8. It is assumed that the image code generation unit 36 stores in advance the arrangement of the colors of the individual cells in the cell string of the main code of the optical symbol.

Figure 9:
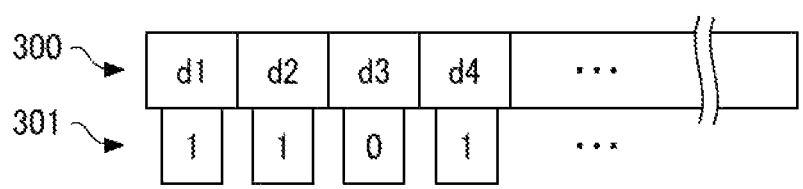
FIG. 9 is a diagram illustrating information to be encoded into an optical symbol according to embodiments of the present disclosure.
Figure 10:
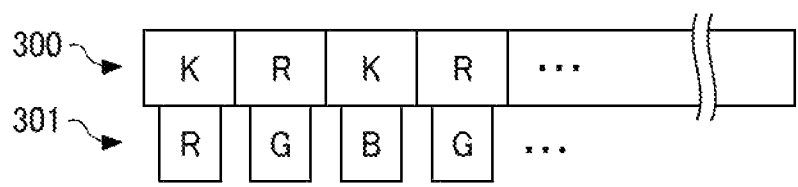
FIG. 10 is a diagram illustrating an optical symbol when the number of colors assigned to individual cells of an optical symbol is four, according to embodiments of the present disclosure.

Referring to FIGS. 9 and 10, a detailed description is given of a case where the number of colors assigned to the individual cells of the optical symbol is four. FIG. 9 is a diagram illustrating information to be encoded into an optical symbol according to the present embodiment. FIG. 10 is a diagram illustrating an optical symbol when the number of colors assigned to individual cells of an optical symbol is four, according to the present embodiment.

In FIG. 9, a sub-code section 301 including cells of values "3d1," "3d1," "3d0," and "3d1" that are respectively connected to cells of "d1," "d2," "d3," and "d4" of a main code section 300 is illustrated.

In FIG. 10, an optical symbol into which the information illustrated in FIG. 9 is encoded according to the encoding rule described with reference to FIG. 8 is illustrated. In the present embodiment described with reference to FIG. 10, the cell string of the main code section 300 includes an even number of cells, and K and R are alternately arranged in the cells with K in the cell at the tip of the cell string.

In addition, a color is assigned to the cell, for example, at the left end of the sub-code section 301 connected to the cell of the main code section 300 to which K is assigned as a color of a first transition origin. In the present embodiment described with reference to FIG. 10, according to K as the color of the first transition origin in the cell of the main code section 300 and the value "3d1" in the cell of the sub-code section 301, with reference to the encoding rule illustrated in part (a) of FIG. 8, R is assigned to the cell at the left end of the sub-code section 301 of the optical symbol.

In step S18 following step S16 in FIG. 6, the image code transmission unit 38 transmits the color code image 811 corresponding to the job ID acquired from the job list to the customer system 10.

In step S20, the image code reception unit 64 of the customer system 10 receives the color code image 811 from the work process management system 14. The slip creation unit 66 creates the slip 810 (a slip with a color code image) for the work process management system 14 on which the color code image 811 is presented. In step S22, the print instruction unit 68 instructs the printer 16 to print the slip 810 for the work process management system 14 created by the slip creation unit 66.

Figure 11:
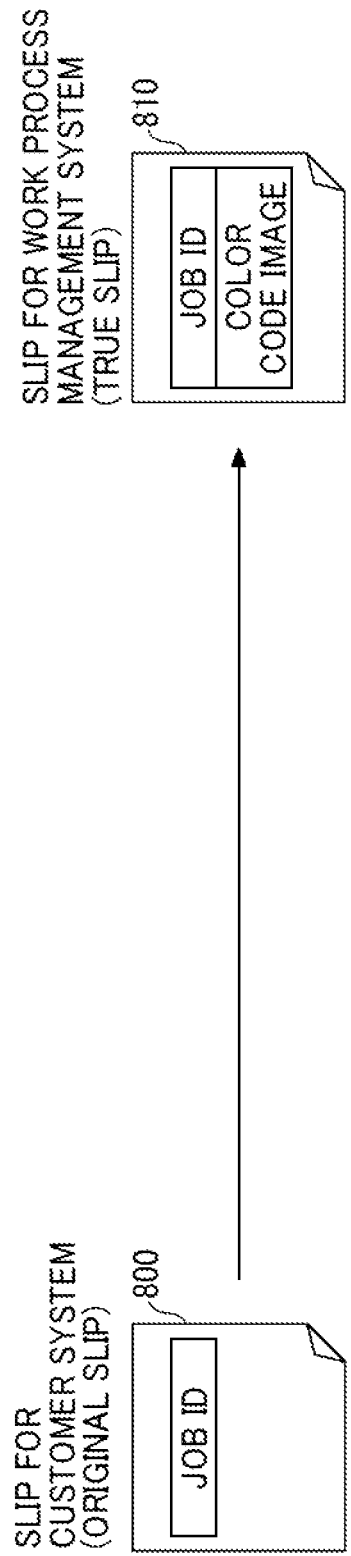
FIG. 11 is a diagram illustrating a slip printed by an information processing system under normal operating conditions according to embodiments of the present disclosure.

The relation between the slip 810 for the work process management system 14 printed according to the processing illustrated in FIG. 6 and the slip 800 for the customer system 10 is as illustrated in FIG. 11. FIG. 11 is a diagram illustrating a slip printed by the information processing system 1 under normal operating conditions according to the present embodiment.

The slip 800 for the customer system 10 is an original slip. The job ID of the slip 800 for the customer system 10 serves as the first type of identification information. In the present embodiment, the slip 810 for the work process management system 14 in which the job ID of the slip 800 for the customer system 10 and the color code image are associated with each other is printed. The slip 810 for the work process management system 14 illustrated in FIG. 11 is a true slip. The color code image presented on the slip 810 for the work process management system 14 illustrated in FIG. 11 serves as a first image code. The slip 810 for the work process management system 14 illustrated in FIG. 11 serves as a first slip.

Figure 12:
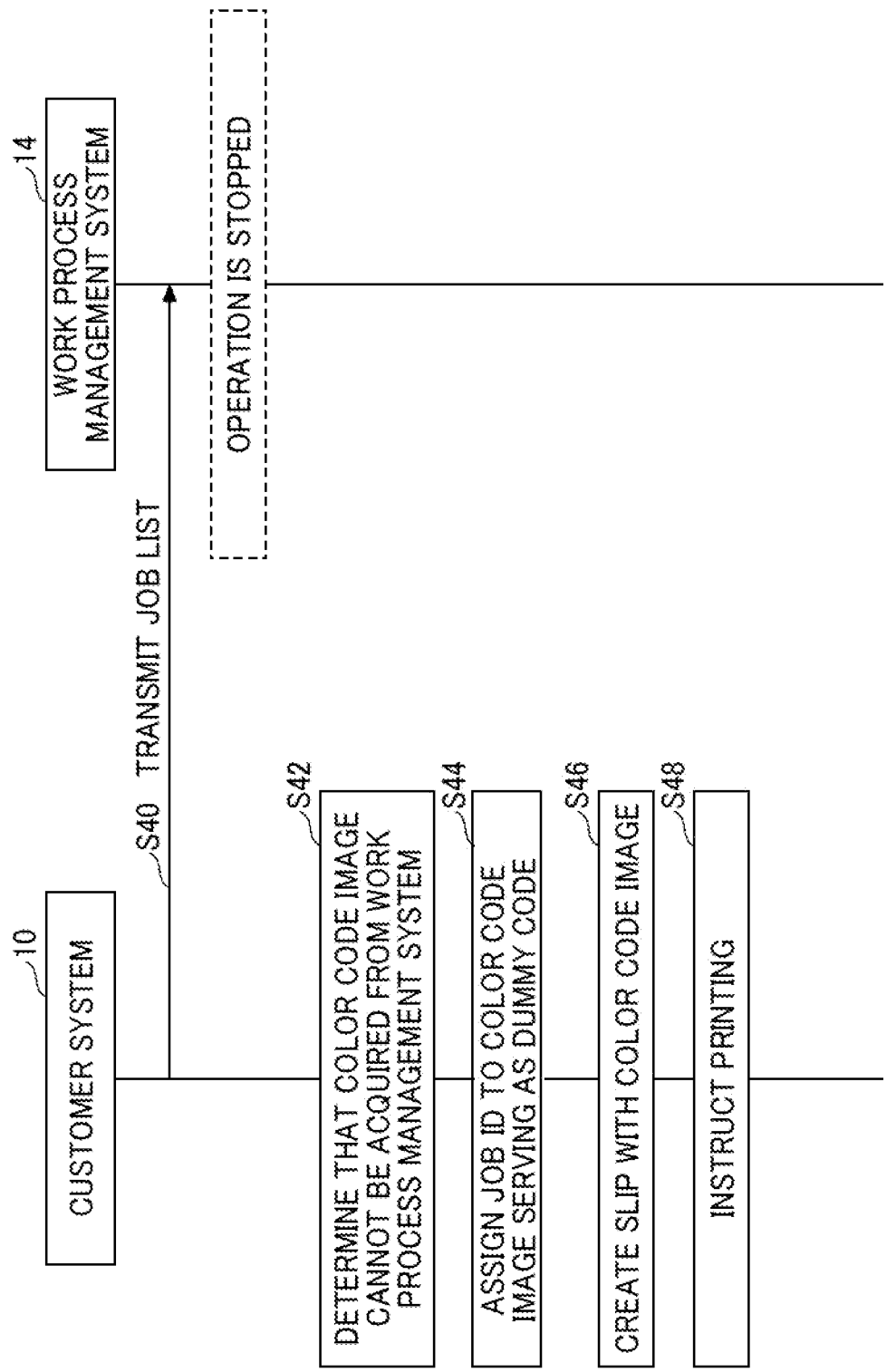
FIG. 12 is a sequence chart illustrating processing to create a slip with a color code image serving as a dummy code according to embodiments of the present disclosure.

When the work process management system 14 is stopped due to a failure, the processing of the information processing system 1 is performed, for example, as illustrated in FIG. 12. FIG. 12 is a sequence chart illustrating processing to create a slip with a color code image serving as a dummy code according to the present embodiment.

In step S40, the job ID transmission unit 62 of the customer system 10 transmits the job list to the work process management system 14. In FIG. 12, since the operation of the work process management system 14 is stopped, the customer system 10 does not receive the color code image 811 corresponding to the job ID transmitted to the work process management system 14.

When the work process management system 14 does not respond even after a certain time period has passed since the job list is transmitted to the work process management system 14 in step S40, the slip creation unit 66 of the customer system 10 determines in step S42 that the color code image 811 cannot be acquired from the work process management system 14. In step S44, the slip creation unit 66 acquires a color code image serving as a dummy code from the dummy code storage unit 80, and assigns the job ID of the job included in the job list to the color code image.

In step S46, the slip creation unit 66 creates a slip (a provisional slip with a dummy code image) for the work process management system 14 on which the color code image serving as the dummy code is presented, as will be described later. In step S48, the print instruction unit 68 instructs the printer 16 to print the provisional slip with a dummy code image.

Figure 13:
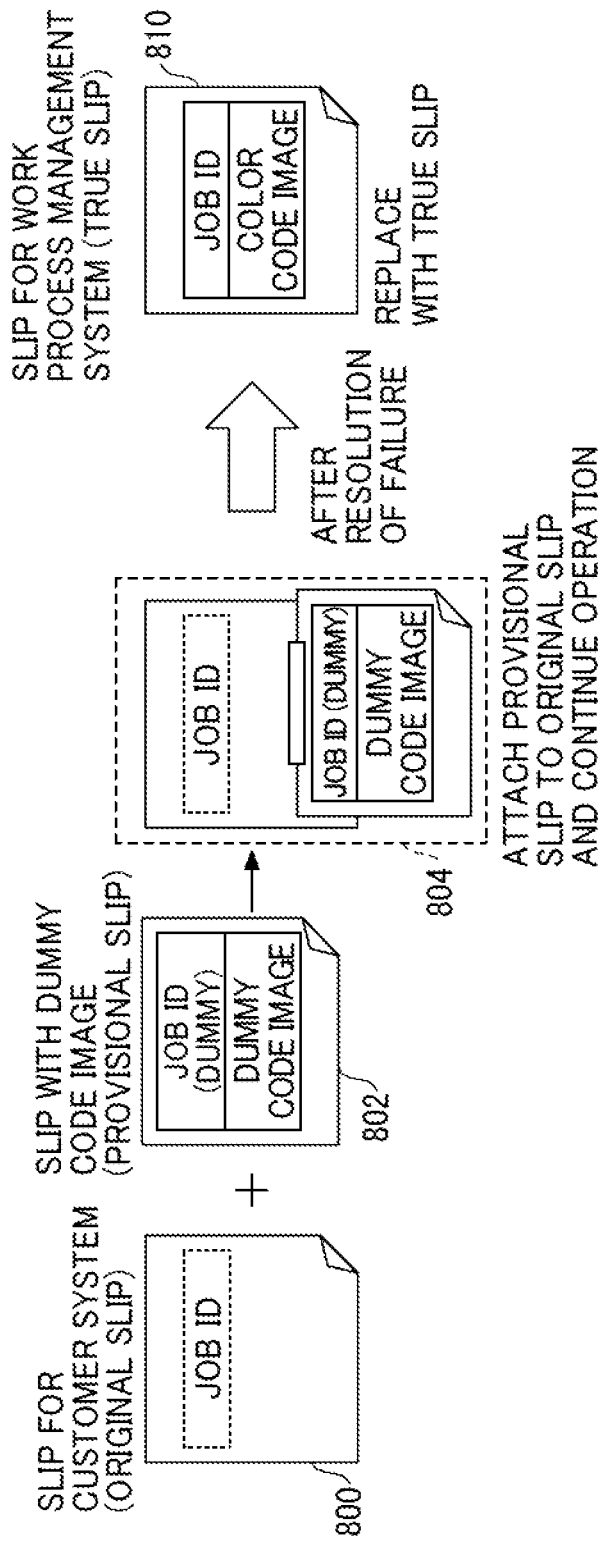
FIG. 13 is a diagram illustrating a slip printed by an information processing system when the operation of a work process management system is stopped, according to embodiments of the present disclosure.

The relation between the provisional slip with a dummy code image printed according to the processing illustrated in FIG. 12 and the slip 800 for the customer system 10 is as illustrated in FIG. 13. FIG. 13 is a diagram illustrating a slip printed by the information processing system 1 when the operation of the work process management system 14 is stopped, according to the present embodiment.

The slip 800 for the customer system 10 is the original slip. A slip 802 with a dummy code image is a provisional slip. The job ID of the slip 800 for the customer system serves as the first type of identification information. The job ID of the slip 802 with a dummy code image serves as a second type of identification information. The slip 802 with a dummy code image may be printed in advance of the occurrence of a failure, such as when the work process management system 14 is prepared or set prior to the start of operation of the work process management system 14 or between operations. Alternatively, the dummy code image may be directly transmitted from the work process management system 14 to the printer 16 and printed in advance.

Figure 20:
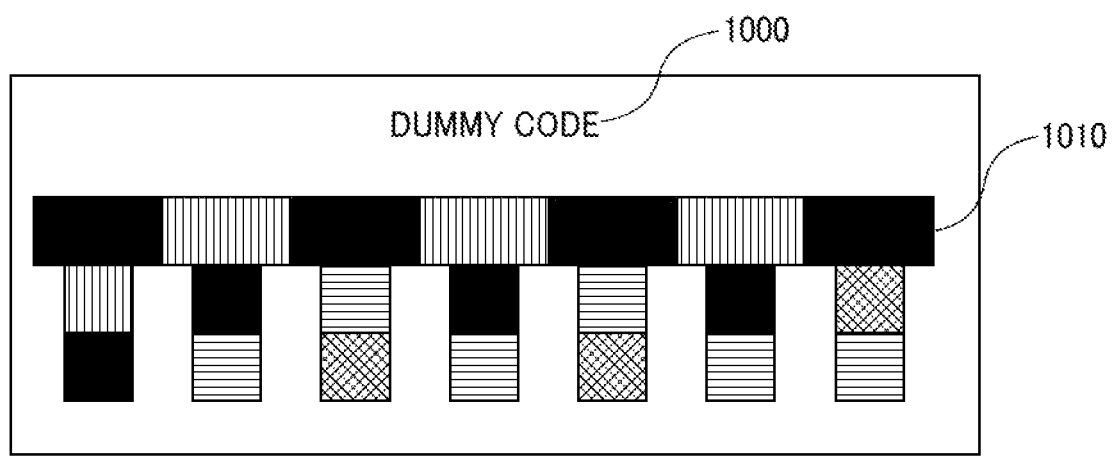
FIG. 20 is a diagram illustrating an appearance of a dummy code image according to embodiments of the present disclosure.

FIG. 20 is a diagram illustrating an appearance of a dummy code image according to the present embodiment. As illustrated in FIG. 20, the dummy code image includes an identification mark 1000 indicating that the image is a dummy code image and a color code image 1010 that is a dedicated color code ID used as a dummy code ID. For example, in FIG. 20, a "dummy code" that serves as the identification mark 1000 indicating that the image is a dummy code image is presented.

The dummy code image may be prepared at a certain place in advance as data of the dummy code image or a sheet on which the dummy code image is presented. For example, the operator may instruct the information processing system to copy the sheet on which the dummy code image is presented and place a copy of the sheet on a material together with the slip 800 for the customer system 10. Alternatively, for example, the operator may instruct the information processing system to use the data of the dummy code image to combine the dummy code image with the slip 800 for the customer system 10 and print the slip 800 with the dummy code image on a sheet. The dummy code may also be referred to as a special code indicating a special job different from an ordinary job or a provisional code.

In the present embodiment, the information processing system 1 continues the processing using the slip 800 for the customer system 10 to which the slip 802 with a dummy code image is attached as a slip 804. The slip 804 is obtained by attaching the slip 802 with a dummy code image to the slip 800 for the customer system 10, using, for example, an adhesive tape, an adhesive, or a clip. The slip 804 is not limited to the form described above. Any form can be used as long as the slip 802 with a dummy code image and the slip 800 for the customer system 10 are moved together. On the slip 804, a color code image (a dummy code image) serving as the dummy code associated with the dummy job ID is presented. The slip 804 is used, for example, during the occurrence of a failure.

The slip 804 created at the occurrence of the failure is replaced with the slip 810 for the work process management system 14 after the failure is resolved. The operator instructs printing of the slip 810 for the work process management system 14 in which the job ID of the slip 800 for the customer system 10 and the color code image are associated with each other. The slip 810 for the work process management system 14 illustrated in FIG. 13 is a true slip. Each of the dummy code image of the slip 802 with a dummy code image and the dummy code image of the slip 804 in FIG. 13 serves as a second image code. Each of the slip 802 with a dummy code image and the slip 804 in FIG. 13 serves as a second slip.

Update of Job Status when Passing through Gate

In the information processing system 1 according to the present embodiment, the job status in the job management table storage unit 52 is updated as described below when the true slip on which the color code image is presented or the provisional slip on which the dummy code image is presented is captured by the camera 18a.

Figure 14:
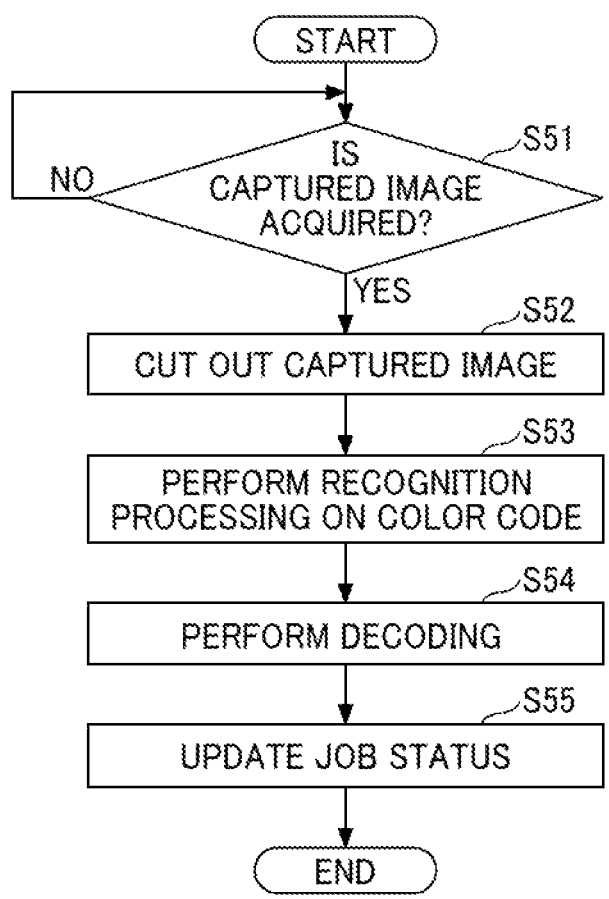
FIG. 14 is a flowchart of processing to update job status when a gate is passed according to embodiments of the present disclosure.

FIG. 14 is a flowchart of processing to update job status when a gate is passed according to the present embodiment. When the captured image acquisition unit 40 of the work process management system 14 acquires a captured image or a captured moving image from the camera 18a, the processing proceeds to step S52 from step S51.

In step S52, the recognition unit 42 attempts to cut out a color code image or a dummy code image from the captured image or the captured moving image acquired by the captured image acquisition unit 40. In step S53, the recognition unit 42 performs recognition processing on the color code image or the dummy code image.

When the color code image or the dummy code image is recognized, the recognition unit 42 detects images of cells from the color code image or the dummy code image. In step S54, the recognition unit 42 recognizes the color information of the cells detected in step S53 and the connection information of the cells as symbol information.

In step S54, the recognition unit 42 decodes the symbol information in accordance with the encoding rule illustrated in part (a) of FIG. 8 to restore the color code ID encoded in the color code image or the dummy code image.

In step S55, the recognition unit 42 transmits the identification information of the camera 18a that has captured the color code image or the dummy code image, and the color code ID restored by decoding to the management unit 34. The management unit 34 refers to the job management table storage unit 52 to specify a job ID corresponding to the color code ID or a dummy job ID.

The management unit 34 updates the job status managed in the job management table storage unit 52 based on the identification information of the camera 18a that has captured the color code image and the job ID corresponding to the color code ID restored from the color code image. Also, the management unit 34 manages the positions of the slip 802 with a dummy code image and the slip 804 illustrated in FIG. 13, for example, by updating data as illustrated in FIG. 15, based on the identification information of the camera 18a that has captured the dummy code image and the dummy job ID corresponding to the color code ID restored from the dummy code image.

Figure 15:
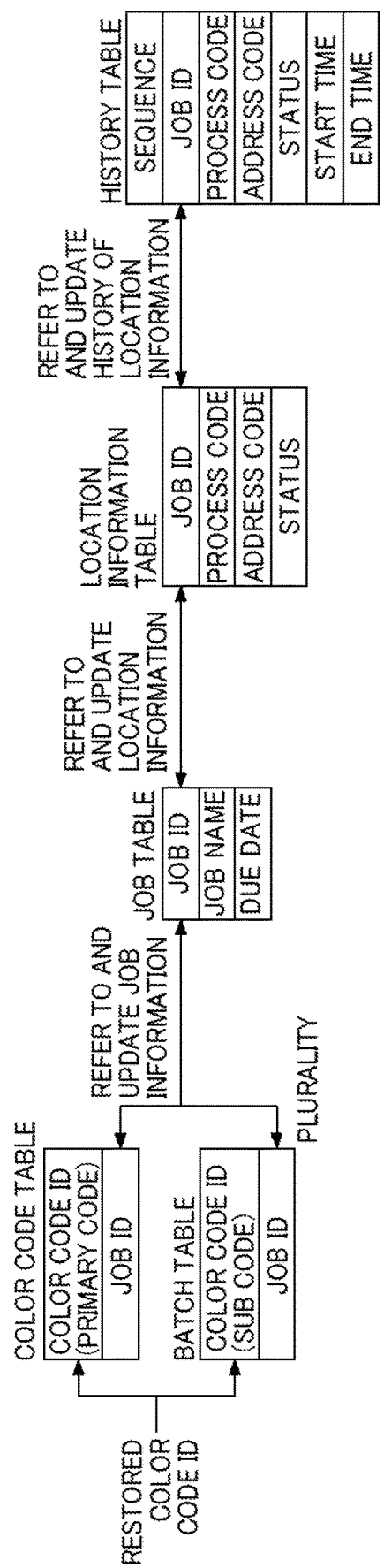
FIG. 15 is a diagram illustrating a data structure of data managed by a management unit according to embodiments of the present disclosure.

FIG. 15 is a diagram illustrating a data structure of data managed by the management unit 34 according to the present embodiment. For example, a color code table is stored in the color code management table storage unit 50. A job table, a location information table, and a history table are stored in the job management table storage unit 52.

The color code table, the job table, the location information table, and the history table of FIG. 15 are associated with each other by a job ID. Accordingly, in the present embodiment, positions can be specified from the location information table associated with the color code ID restored from the dummy code image.

Display of Position of Provisional Slip A user such as the operator of the information processing system 1 operates a user interface screen provided by the work process management system 14 to display the position of a provisional slip.

Figure 16:
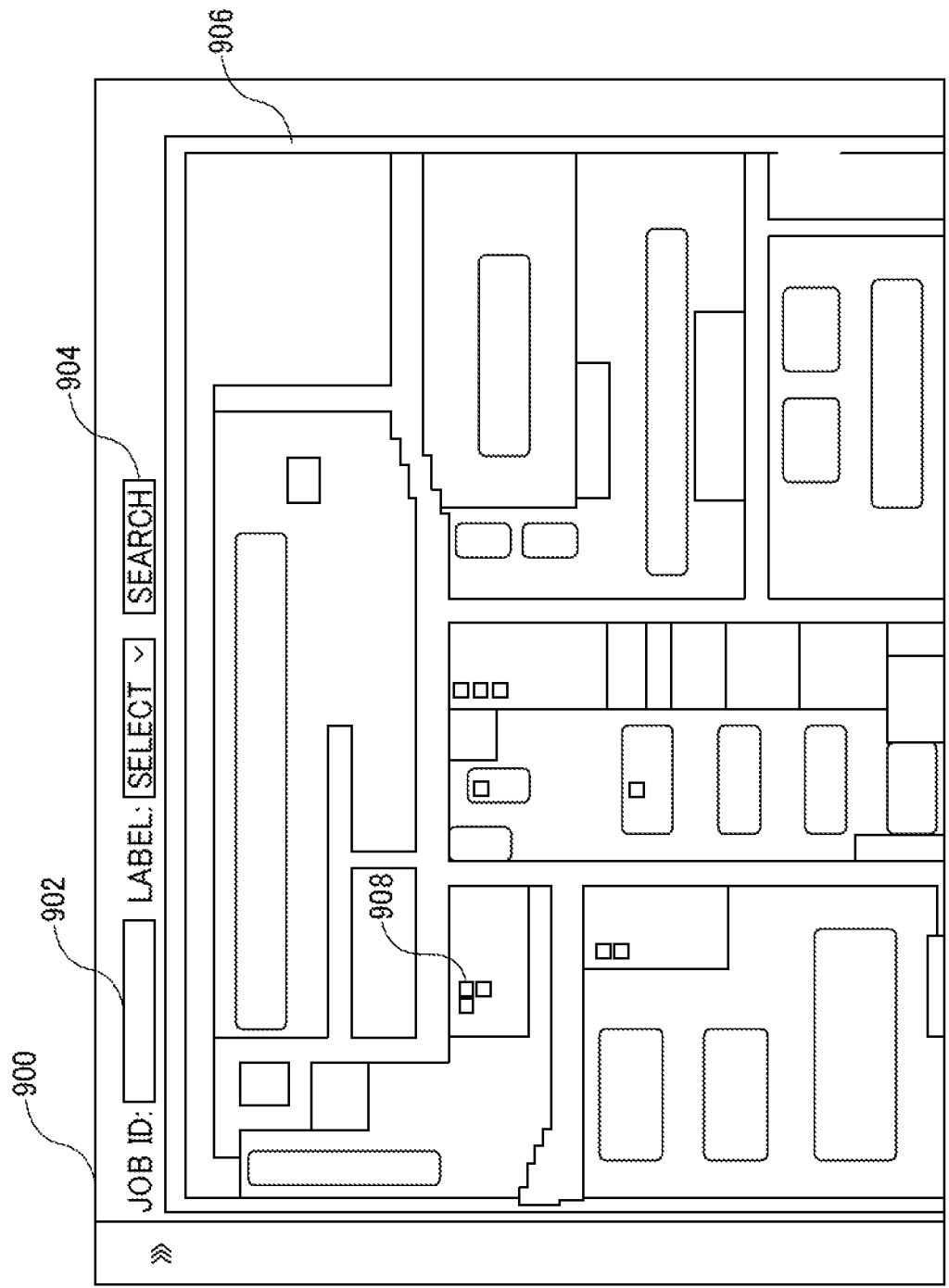
FIG. 16 is a diagram illustrating a user interface screen displayed by a work process management system according to embodiments of the present disclosure.

FIG. 16 is a diagram illustrating a user interface screen displayed by the work process management system 14 according to the present embodiment. The user interface unit of the work process management system 14 displays, for example, a screen 900 on a display device (such as the display 506). The screen 900 includes a job ID input field 902, a search button 904, and a map display field 906.

When the operator inputs a job ID into the job ID input field 902 and presses the search button 904, a position 908 of a job corresponding to the job ID is displayed on a map of the map display field 906.

For example, when the operator inputs the dummy job ID of the slip 802 with a dummy code image into the job ID input field 902 and presses the search button 904, the position 908 of the job corresponding to the dummy job ID is displayed on the map of the map display field 906.

In response to an instruction from the operator, the information processing system 1 issues a provisional slip at the occurrence of a failure and records a dummy job ID presented on the provisional slip. The dummy job ID may be recorded in a list, or an image of the provisional slip may be recorded as the dummy job ID. After the failure is resolved, the operator replaces the provisional slip issued at the occurrence of the failure with a true slip according to the processing illustrated in FIG. 17.

Figure 17:
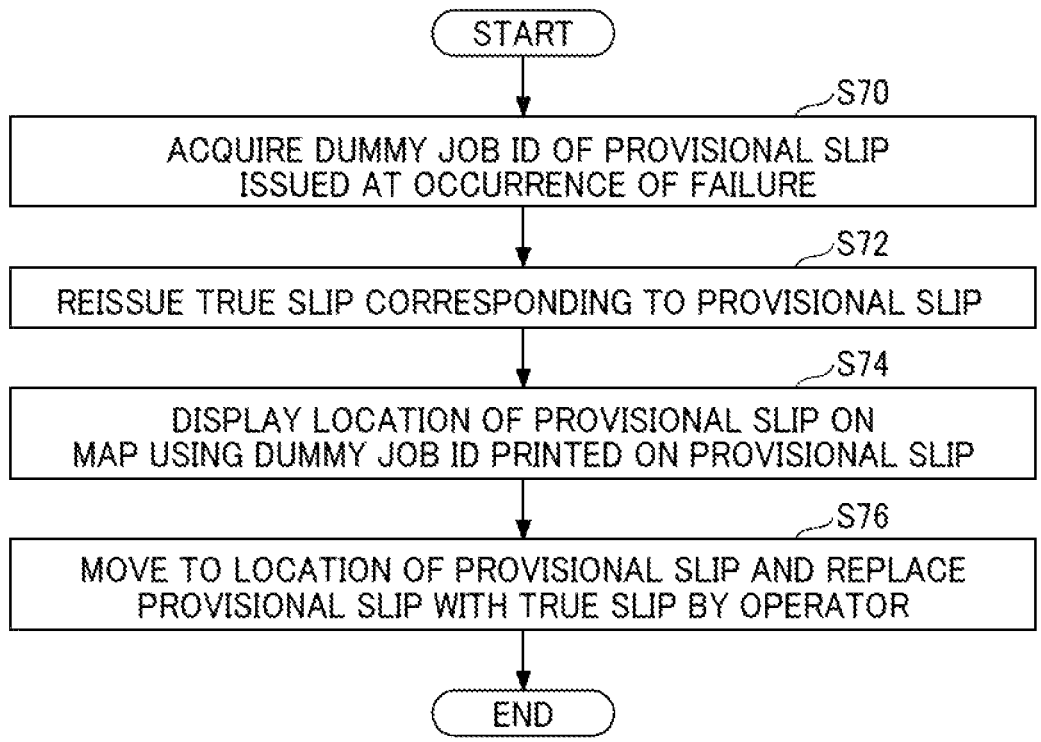
FIG. 17 is a flowchart of processing to replace a provisional slip with a true slip according to embodiments of the present disclosure.

FIG. 17 is a flowchart of processing to create a true slip to replace a provisional slip with the true slip according to the present embodiment. In step S70, according to an operation by the operator, the work process management system 14 acquires the dummy job ID of the provisional slip issued at the occurrence of the failure. In step S72, the work process management system 14 reissues a true slip of the job corresponding to the provisional slip according to the processing illustrated in FIG. 6.

The dummy job ID of the provisional slip issued at the occurrence of the failure may be acquired by, for example, uploading a list of job IDs (such as a comma-separated values (CSV) file) or storing an image file (such as a portable document format (PDF) file) of the provisional slip in a specific folder. Accordingly, the operator can easily instruct printing the true slip to replace the provisional slip issued at the occurrence of the failure.

In step S74, the operator inputs the dummy job ID presented on the provisional slip into the job ID input field 902 of the screen 900 illustrated in FIG. 16 and presses the search button 904 to display the position 908 of the provisional slip on the map of the map display field 906.

In step S76, the operator moves to the position 908 of the provisional slip displayed on the map of the map display field 906, and replaces the provisional slip with the true slip. The operator repeats replacing the provisional slip with the true slip until the position 908 of the provisional slip is no longer displayed on the map.

Information (for example, characters representing a dummy code, a mark representing a dummy code, or a color representing a dummy code) that allows the operator to visually recognize that the slip is a provisional slip may be presented on the provisional slip to facilitate the replacement work with visual observation. The dummy job ID may be a single piece of identification information so that all provisional slips can be retrieved by a single search. Alternatively, the dummy job ID may be identification information that includes a common part so that all provisional slips can be retrieved by a single search.

In the present embodiment, the true slip and the provisional slip are printed on a print medium such as paper by the printer 16. In another embodiment of the present disclosure, the true slip and the provisional slip may be displayed on a display medium (a display device) such as electronic paper or a liquid crystal display (LCD).

The information processing system 1 according to the present embodiment can distinguish a specific job (such as a job corresponding to a provisional slip issued when a failure occurs) from an ordinary job (such as a job corresponding to a true slip issued when a failure does not occur) and identify a position of the specific job. Thus, the information processing system 1 according to the present embodiment supports the facilitation of recovery work performed by the operator such as replacement work to replace the provisional slip with the true slip. Further, the information processing system 1 according to the present embodiment may use a provisional slip for the purpose of drawing the attention of the operator to a specific type of job to be distinguished from ordinary jobs. A dummy code ID is a piece of identification information (or identification information including a common part for a plurality of dummy code IDs) that is independent and is not associated with a job ID. Since the dummy code ID is a single piece of identification information (or identification information including a common part), in the present embodiment, all provisional slips can be retrieved distinguishably from a true slip by a single search using the dummy code ID or the common part. The identification mark 1000 illustrated in FIG. 20 facilitates replacement of the provisional slip with the true slip with visual observation. When a branch number is generated for a job, the same provisional slip is attached to a bundle of sheets or a pallet corresponding to the branch number. Alternatively, a provisional slip indicating that the job has a branch number may be used.

Second Embodiment

In the first embodiment, the provisional slip is replaced with the true slip. In the second embodiment, a provisional slip is registered as a true slip. The second embodiment is substantially the same as the first embodiment except for some parts thereof. Accordingly, descriptions of the same parts as those of the first embodiment are appropriately omitted.

For example, when a failure occurs in the work process management system 14 and the color code image 811 is not received from the work process management system 14, the customer system 10 cannot create the slip 810 on which the color code image 811 is presented. During the occurrence of the failure, the work processes of the job can be continued using the slip 800 for the customer system 10, for example. However, with the slip 800 for the customer system 10 created during the occurrence of the failure, the work process management system 14 cannot manage the work processes of the job after the failure is resolved.

For this reason, in the present embodiment, when a failure occurs in the work process management system 14 and the customer system 10 does not receive the color code image 811 from the work process management system 14, the work processes of the job is continued using a provisional slip on which a color code image serving as a dummy code is presented, as will be described later. In the present embodiment, after the failure is resolved, the provisional slip is registered as a true slip. Thus, the facilitation of recovery work performed by the operator is supported. In the present embodiment, the image data of the provisional slip that is generated in advance can be used.

Figure 18:
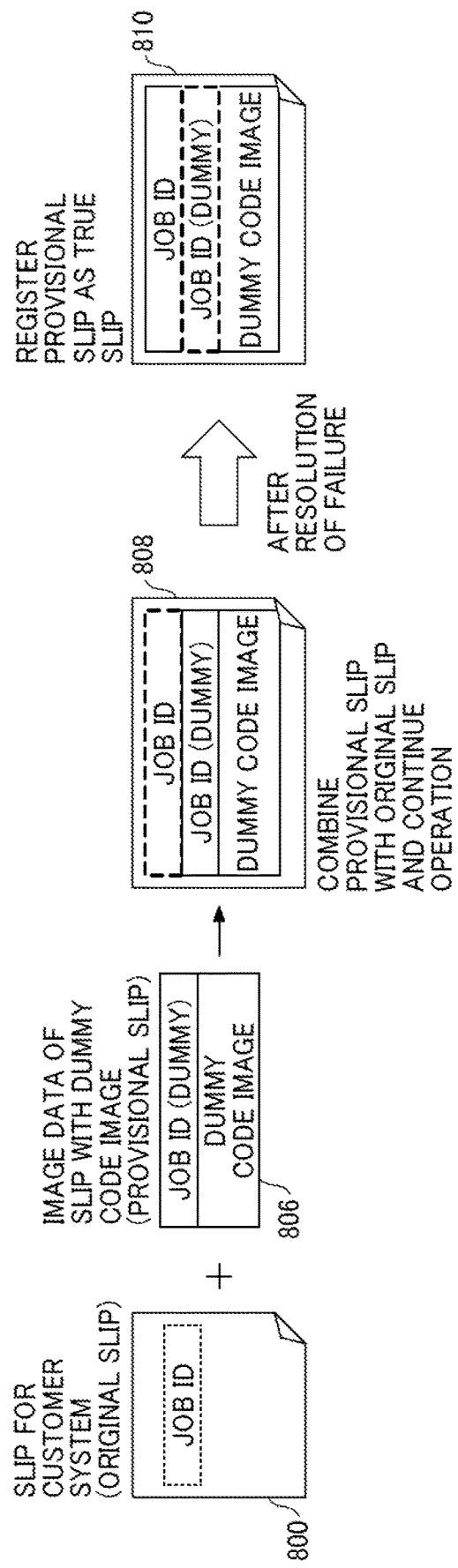
FIG. 18 is a diagram illustrating a slip printed by an information processing system when the operation of a work process management system is stopped, according to embodiments of the present disclosure.

When the work process management system 14 is stopped due to a failure, the processing of the information processing system 1 is performed, for example, as illustrated in FIG. 12. The relation between the provisional slip with a dummy code image printed according to the processing illustrated in FIG. 12 and the slip 800 for the customer system 10 is as illustrated in FIG. 18. FIG. 18 is a diagram illustrating a slip printed by the information processing system 1 when the operation of the work process management system 14 is stopped, according to the present embodiment.

The slip 800 for the customer system 10 is the original slip. Image data 806 representing a slip with a dummy code image is image data representing a provisional slip. The job ID of the slip 800 for the customer system 10 serves as the first type of identification information. The job ID of the slip with a dummy code image represented by the image data 806 serves as the second type of identification information. The image data 806 representing the slip with a dummy code image may be generated in advance.

In the present embodiment, the information processing system 1 continues the processing using a slip 808 in which the image data 806 representing the slip with a dummy code image is combined with the slip 800 for the customer system 10. On the slip 808, the job ID of the original slip, the dummy job ID, and the dummy code image are presented. The slip 808 is used, for example, during the occurrence of a failure. The slip 808 serves as a provisional slip.

The slip 808 created at the occurrence of the failure is registered as the slip 810 for the work process management system 14 after the failure is resolved. The operator registers the slip 808 created at the occurrence of the failure as the slip 810 for the work process management system 14. The slip 810 illustrated in FIG. 18 is a true slip. The dummy code image of the slip 808 illustrated in FIG. 18 serves as the second image code. The slip 808 illustrated in FIG. 18 serves as the second slip.

A user such as the operator of the information processing system 1 operates, for example, the user interface screen illustrated in FIG. 16 to display the position of a provisional slip. For example, when the operator inputs the dummy job ID of the slip 808 illustrated in FIG. 18 into the job ID input field 902 and presses the search button 904, the position 908 of the slip 808 that reflects the work processes of the job corresponding to the dummy job ID is displayed on the map of the map display field 906. After the failure is resolved, the operator instructs to register the provisional slip issued at the occurrence of the failure as a true slip according to the processing illustrated in FIG. 19. The display of the position of the provisional slip on the map serves as display for supporting the replacement work. The operator accesses the work process management system 14 (the user interface unit 30) of the information processing system 1 with a communication terminal (such as a personal computer (PC), a smartphone, or a tablet terminal) to display the map, and can search for the provisional slip at the site while seeing or holding the communication terminal. Thus, the replacement work can be easily performed. In addition, when the provisional slip is replaced with the true slip, the display of the provisional slip disappears and the total number of provisional slips decreases every time a provisional slip is replaced. Accordingly, the provisional slips remaining at the site can be easily grasped.

Figure 19:
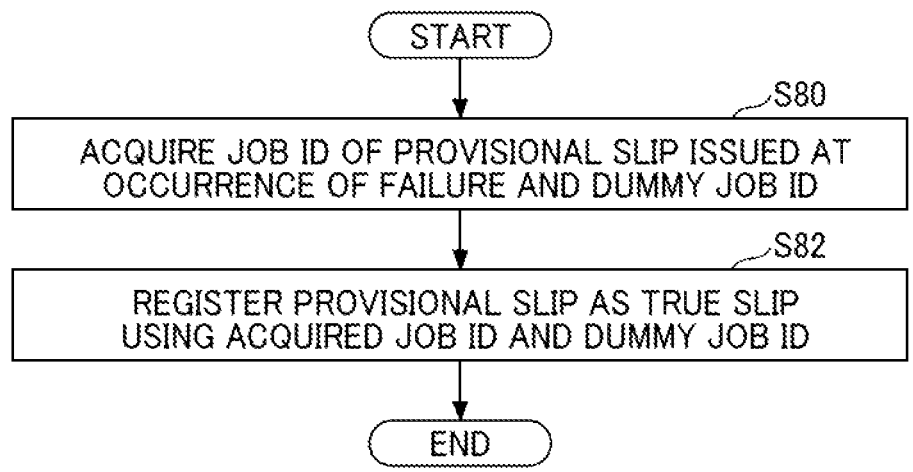
FIG. 19 is a flowchart of processing to register a provisional slip as a true slip according to embodiments of the present disclosure.

FIG. 19 is a flowchart of processing to register a provisional slip as a true slip according to the present embodiment. After the failure is resolved, in step S80, in response to an input from the operator, the work process management system 14 acquires the job ID and the dummy job ID of the slip 808 issued at the occurrence of the failure illustrated in FIG. 18. In step S82, the work process management system 14 updates the dummy job ID associated with the dummy code image of the slip 808 in the work process management system 14 to the job ID of the slip 808 to register the provisional slip as a true slip in the work process management system 14.

The provisional slip is registered as the true slip according to the processing illustrated in FIG. 19. As a result, when the operator inputs the job ID presented on the provisional slip into the job ID input field 902 of the screen 900 illustrated in FIG. 16 and presses the search button 904, the position of the true slip is displayed on the map of the map display field 906.

The information processing system 1 according to the present embodiment can distinguish a specific job (such as a job corresponding to a provisional slip issued when a failure occurs) from an ordinary job (such as a job corresponding to a true slip issued when a failure does not occur) and identify a position of the specific job. As a result, a provisional slip can be continuously used as a true slip in the information processing system 1 according to the present embodiment.

In the second embodiment, the color code ID to be used as the dummy code ID is not fixed. For this reason, for example, information such as a flag for identifying the color code ID to be used as the dummy code ID may be provided in the color code table illustrated in FIG. 15.

The information processing system 1 according to the second embodiment can distinguish a specific job (such as a job corresponding to a provisional slip issued when a failure occurs) from an ordinary job (such as a job corresponding to a true slip issued when a failure does not occur) and identify a position of the specific job. Thus, the information processing system 1 according to the second embodiment supports facilitation of recovery work performed by the operator.

Third Embodiment

The techniques of the first and second embodiments described above can be applied to, for example, techniques of a conveyance system represented by an automated guided vehicle (AGV).

For example, in a conveyance system for conveying an article, the slip 810 for the work process management system 14 on which the color code image 811 is presented is attached to the article, and the article being conveyed is captured by the cameras 18. Thus, the work processes of the article being conveyed by a conveying device can be managed. During the occurrence of a failure in the work process management system 14, the conveyance of the article by the conveying device can be continued by attaching the provisional slip according to the first and second embodiments being attached onto the article. Further, since the position of the provisional slip is easily specified after the failure is solved, recovery work such as replacement work to replace the provisional slip with the true slip is facilitated.

Fourth Embodiment

The techniques of the first and second embodiments described above can be applied to, for example, management of work processes of an article being conveyed by a belt conveyor. For example, in a case that the techniques of the present embodiments are applied to the management of the work processes of the article being conveyed by a belt conveyor, recovery work to track the article being conveyed by the belt conveyor can be facilitated by the provisional slip being used during the occurrence of a failure.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

Aspects of the present disclosure are, for example, as follows.

Aspect 1

An information processing system includes one or more image capturing devices that capture a first slip and a second slip to generate one or more images. The first slip has a first image code corresponding to a first type of identification information thereon, and a second slip has a second image code corresponding to a second type of identification information thereon. The information processing system further includes a management unit that manages a position of the first slip based on the first image code recognized from the one or more images captured by the one or more image capturing devices and also manages a position of the second slip based on the second image code recognized from the one or more images, and a user interface that displays the position of the second slip in response to an operation performed by a user.

Aspect 2

In the information processing system according to Aspect 1, the first type of identification information is information used for identifying a job in a customer system, and the second type of identification information is different from the information used for identifying a job in the customer system.

Aspect 3

In the information processing system according to Aspect 2, when the customer system does not acquire the first image code corresponding to the first type of identification information, the second slip is created using the second image code corresponding to the second type of identification information that has been acquired in advance.

Aspect 4

In the information processing system according to Aspect 2 or 3, the management unit takes over and manages, with another first slip that has been newly created and replaces the second slip, progress information of work processes of the job that has been managed with the second slip.

Aspect 5

In the information processing system according to Aspect 2 or 3, the management unit takes over and manages progress information of the work processes of the job that has been managed with the second slip with the first slip in which the second type of identification information and the second image code presented on the second slip are registered as the first type of identification information and the first image code, respectively.

Aspect 6

The information processing system according to Aspect 4 further includes a slip creation unit that creates the first slip. In the information processing system, the user interface displays the position of the second slip created by the customer system at occurrence of a failure to support work to replace the second slip with the another first slip created by the slip creation unit after the failure is resolved.

Aspect 7

The information processing system according to Aspect 6 further includes an image code generation unit. When the first image code corresponding to the first type of identification information is not acquired due to the occurrence of the failure, the customer system creates the second slip using the second image code corresponding to the second type of identification information acquired in advance. When the first image code corresponding to the first type of identification information is acquired after the failure is resolved, the customer system creates the first slip using the first image code corresponding to the first type of identification information acquired after the failure is resolved.

Aspect 8

In the information processing system according to Aspect 4 or 5, the management unit manages the position of the second slip based on positions associated with the one or more image capturing devices that have captured the second slip and the second image code recognized from the one or more images of the second slip captured by the one or more image capturing devices.

Aspect 9

In the information processing system according to any one of Aspects 4 to 8, the one or more image capturing devices are cameras installed so as to capture the first slip and the second slip at positions corresponding to the work processes of the job.

Aspect 10

In the information processing system according to any one of Aspects 1 to 9, the second slip contains information that allows the user to visually recognize that the second slip is the second slip.

Aspect 11

In the information processing system according to any one of Aspects 1 to 10, the first slip and the second slip are work instruction sheets for a job.

Aspect 12

An information processing method performed by an information processing system includes capturing, by one or more image capturing devices, a first slip and a second slip to generate one or more images. The first slip has a first image code corresponding to a first type of identification information thereon, and a second slip has a second image code corresponding to a second type of identification information thereon. The method further includes managing a position of the first slip based on the first image code recognized from the one or more images captured by the one or more image capturing devices, managing a position of the second slip based on the second image code recognized from the one or more images, and displaying the position of the second slip in response to an operation performed by a user.

Aspect 13

An information processing apparatus obtains one or more images of a first slip and a second slip. The first slip has a first image code corresponding to a first type of identification information thereon, and a second slip has a second image code corresponding to a second type of identification information thereon. The information processing apparatus includes a management unit that manages a position of the first slip based on the first image code recognized from the one or more images and also manages a position of the second slip based on the second image code recognized from the one or more images, and a user interface that displays the position of the second slip in response to an operation performed by a user.

Aspect 14

A non-transitory recording medium storing a plurality of program codes which, when executed by one or more processors, causes an information processing apparatus to perform an information processing method. The method includes obtaining a first slip and a second slip. The first slip has a first image code corresponding to a first type of identification information thereon, and a second slip has a second image code corresponding to a second type of identification information thereon. The method further includes managing a position of the first slip based on the first image code recognized from the one or more images, managing a position of the second slip based on the second image code recognized from the one or more images, and displaying the position of the second slip in response to an operation performed by a user.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carries out or is programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing system comprising:
one or more image capturing devices configured to capture a first slip and a second slip to generate one or more images, the first slip having a first image code corresponding to a first type of identification information thereon, and the second slip having a second image code corresponding to a second type of identification information thereon;
first circuitry configured to
manage a position of the first slip based on the first image code recognized from the one or more images,
manage a position of the second slip based on the second image code recognized from the one or more images, and
display the position of the second slip in response to an operation performed by a user; and
a customer system, the first type of identification information being information used for identifying a job in the customer system, and the second type of identification information being different from the information used for identifying a job in the customer system, the customer system including
second circuitry configured to
in a case that the first image code corresponding to the first type of identification information is not acquired at the customer system, create the second slip using the second image code corresponding to the second type of identification information that has been acquired in advance.

2. The information processing system according to claim 1, wherein the second slip contains information that allows the user to visually recognize that the second slip is the second slip.

3. The information processing system according to claim 1, wherein
the first slip and the second slip are work instruction sheets for a job.

4. An information processing system comprising:
one or more image capturing devices configured to capture a first slip and a second slip to generate one or more images, the first slip having a first image code corresponding to a first type of identification information thereon, and the second slip having a second image code corresponding to a second type of identification information thereon;
first circuitry configured to
manage a position of the first slip based on the first image code recognized from the one or more images,
manage a position of the second slip based on the second image code recognized from the one or more images, and
display the position of the second slip in response to an operation performed by a user; and
a customer system, the first type of identification information being information used for identifying a job in the customer system, and the second type of identification information being different from the information used for identifying a job in the customer system, the customer system including
second circuitry configured to
create another first slip to replace the second slip, and manage progress information of work processes of the job having been managed with the second slip, using the another first slip.

5. The information processing system according to claim 4, wherein the first circuitry is further configured to display the position of the second slip created by the customer system at occurrence of a failure to support the user in replacing the second slip with the another first slip created after the failure is resolved.

6. The information processing system according to claim 5, wherein
the second circuitry is further configured to:
create the second slip using the second image code corresponding to the second type of identification information acquired in advance in a case that the first image code corresponding to the first type of identification information is not acquired due to the occurrence of the failure; and
create the first slip using the first image code corresponding to the first type of identification information acquired after the failure is resolved in a case that the first image code corresponding to the first type of identification information is acquired after the failure is resolved.

7. The information processing system according to claim 4, wherein the first circuitry is configured to manage the position of the second slip based on positions associated with the one or more image capturing devices that have captured the second slip and the second image code recognized from the one or more images of the second slip captured by the one or more image capturing devices.

8. The information processing system according to claim 4, wherein the one or more image capturing devices are cameras installed so as to capture the first slip and the second slip at positions corresponding to the work processes of the job.

9. An information processing method comprising:
capturing, by one or more image capturing devices, a first slip and a second slip to generate one or more images, the first slip having a first image code corresponding to a first type of identification information thereon, and the second slip having a second image code corresponding to a second type of identification information thereon, the first type of identification information being information used for identifying a job in a customer system, and the second type of identification information being different from the information used for identifying a job in the customer system;
managing a position of the first slip based on the first image code recognized from the one or more images;
managing a position of the second slip based on the second image code recognized from the one or more images;
displaying the position of the second slip in response to an operation performed by a user, and
in a case that the first image code corresponding to the first type of identification information is not acquired at the customer system, creating the second slip using the second image code corresponding to the second type of identification information that has been acquired in advance.

10. A non-transitory recording medium storing a plurality of program codes which, when executed by one or more processors, causes the one or more processors to perform the information processing method of claim 9.

11. An information processing system comprising:
one or more image capturing devices configured to capture a first slip and a second slip to generate one or more images, the first slip having a first image code corresponding to a first type of identification information thereon, and the second slip having a second image code corresponding to a second type of identification information thereon;
circuitry configured to
manage a position of the first slip based on the first image code recognized from the one or more images,
manage a position of the second slip based on the second image code recognized from the one or more images, and
display the position of the second slip in response to an operation performed by a user; and
a customer system, the first type of identification information being information used for identifying a job in the customer system, and the second type of identification information being different from the information used for identifying a job in the customer system, wherein
the circuitry is further configured to
register the second type of identification information and the second image code, as the first type of identification information and the first image code, respectively, to manage progress information of work processes of the job using the second slip, and manage the progress information of the work processes of the job having been managed with the second slip, using the first slip.

12. An information processing apparatus comprising:
first circuitry configured to:

obtain one or more images of a first slip and a second slip, the first slip having a first image code corresponding to a first type of identification information thereon, and the second slip having a second image code corresponding to a second type of identification information thereon;

manage a position of the first slip based on the first image code recognized from the one or more images;

manage a position of the second slip based on the second image code recognized from the one or more images; and display the position of the second slip in response to an operation performed by a user, wherein a customer system, the first type of identification information being information used for identifying a job in the customer system, and the second type of identification information being different from the information used for identifying a job in the customer system, the customer system including second circuitry configured to in a case that the first image code corresponding to the first type of identification information is not acquired at the customer system, create the second slip using the second image code corresponding to the second type of identification information that has been acquired in advance.

* * * * *